Sept. 22, 1953 H. G. HOLTZ 2,652,669
PACKAGING TABLE-READY MEAT
Filed April 8, 1952 5 Sheets-Sheet 1

INVENTOR.
Harry G. Holtz
BY
R. L. Story
ATTORNEY

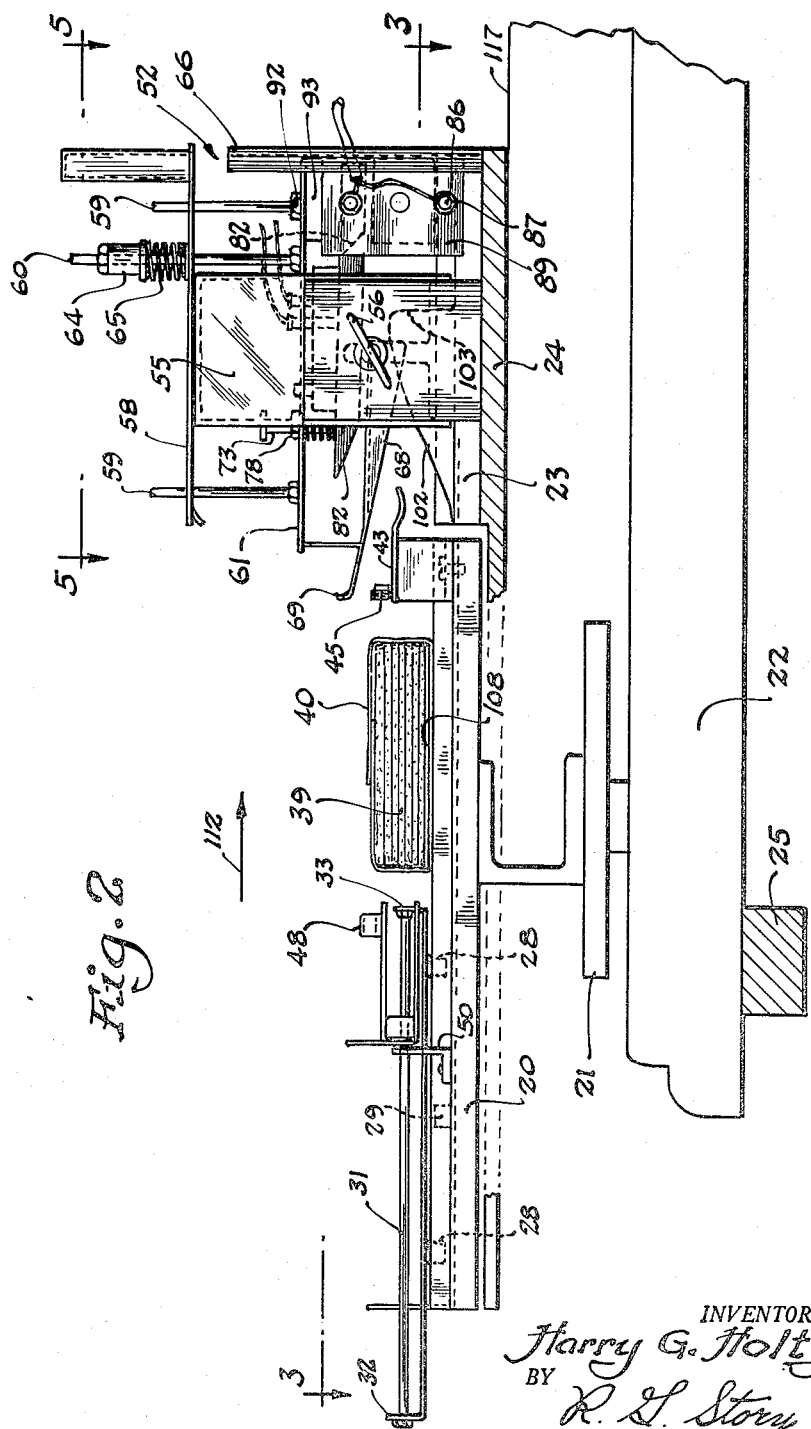

Sept. 22, 1953 H. G. HOLTZ 2,652,669
PACKAGING TABLE-READY MEAT
Filed April 8, 1952 5 Sheets-Sheet 3
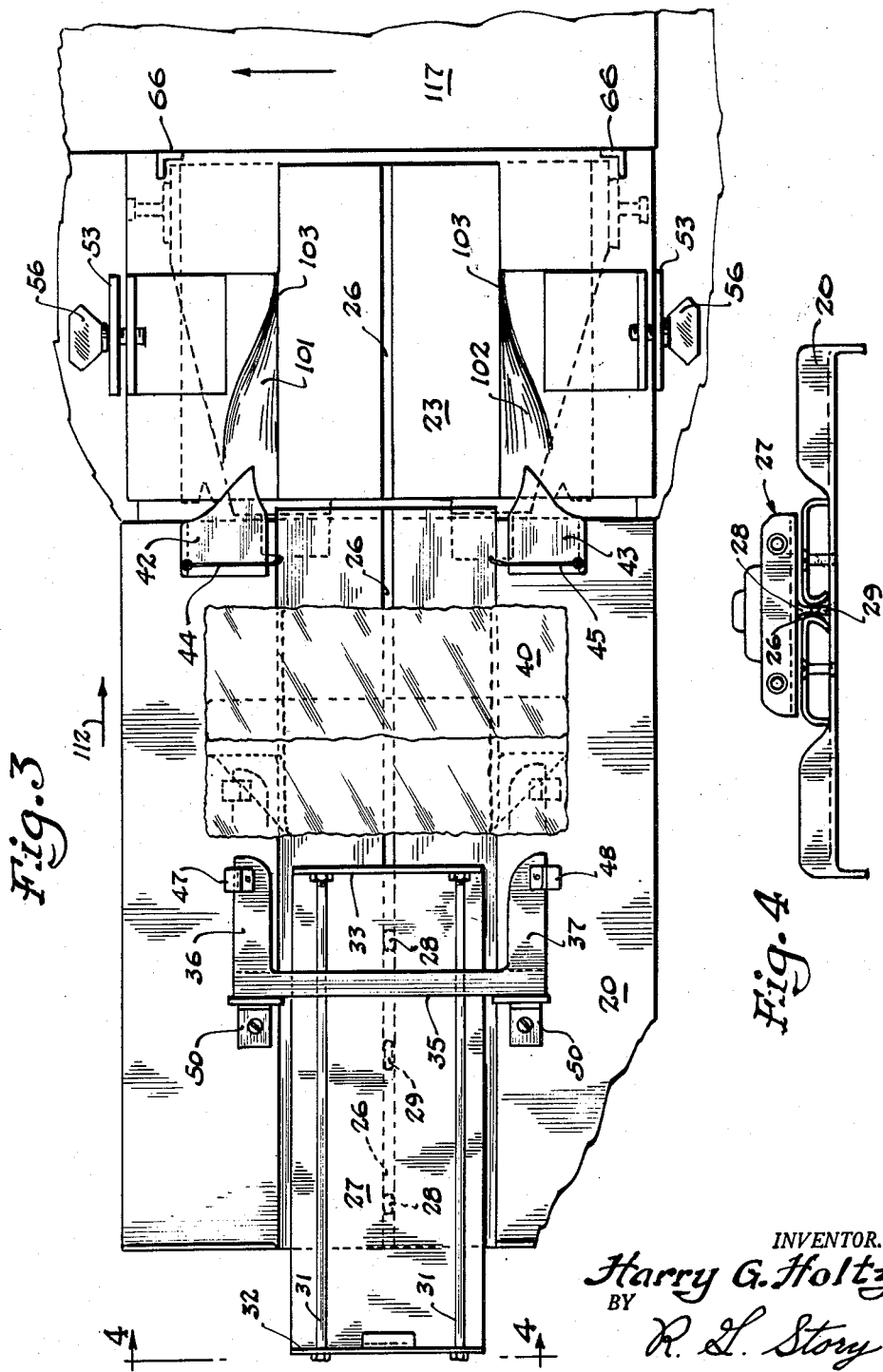
INVENTOR.
Harry G. Holtz
BY
R. L. Story
ATTORNEY Sept. 22, 1953      H. G. HOLTZ      2,652,669
PACKAGING TABLE-READY MEAT Filed April 8, 1952      5 Sheets-Sheet 4

INVENTOR.
Harry G. Holtz
BY R. L. Story
ATTORNEY

Sept. 22, 1953     H. G. HOLTZ     2,652,669
PACKAGING TABLE-READY MEAT
Filed April 8, 1952     5 Sheets—Sheet 5
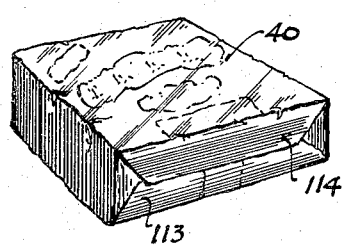
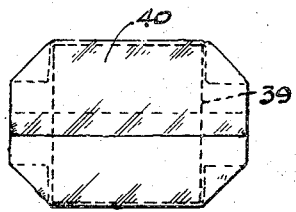
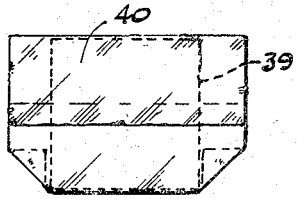
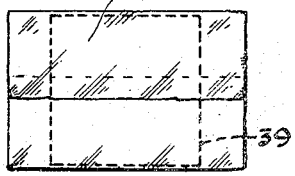
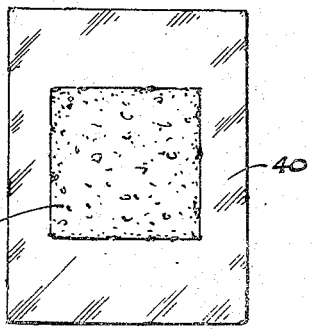
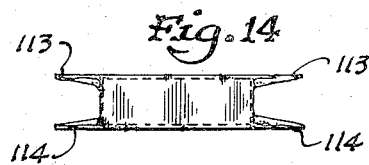
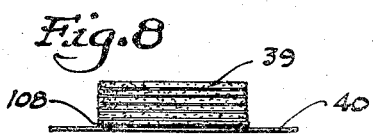
INVENTOR.
Harry G. Holtz
BY R. L. Story
ATTORNEY Patented Sept. 22, 1953

2,652,669

UNITED STATES PATENT OFFICE 2,652,669

PACKAGING TABLE-READY MEATS

Harry G. Holtz, Oak Lawn, Ill., assignor to Swift & Company, Chicago, Ill., a corporation of Illinois Application April 8, 1952, Serial No. 281,135

3 Claims. (Cl. 53—74)

The present invention relates to a device for use in preparing wrapped and sealed packages of a given weight of product, such as sliced meat or the like.

The growth of the self-service stores has produced a substantial demand for sealed packages of sliced cold meats. Preferably, the packages are of uniform weight and thus a uniform price. The packages must be attractively prepared to maintain a favorable position in the race for consumer acceptance.

Traditionally, weighing and wrapping have been hand operations. Modern developments have led to the production of automatic machines which performed all the operations in the production of a wrapped and sealed package. Between these extremes there is a middle ground where for one reason or another, such as relatively small volume production or large variance within certain permissible tolerances, an automatic machine is not economically justified and yet the cost of doing the job by hand labor is a substantial item. The principal object of the present invention is to provide an apparatus, herein loosely referred to as a jig, for facilitating and speeding hand weighing, wrapping, and sealing of packages to reduce the cost of producing sealed packages of a given weight of product by hand labor and to put the small producer, using such hand operations, into a competitive range with one employing more extensive machine operations.

A further object is to provide a device which can be operated by unskilled labor to produce an impeccable package which will not compare unfavorably in the market place with those produced by other means. While the operator will speed up and increase his volume of output after being on the job a little while, there is no extensive introductional instruction needed, nor any necessity for discarding the initial output because of not meeting the standards of acceptability.

Other objects and advantages include: a device which is simple in structure with an accompanying reasonableness in the capital investment involved; a device which has little to get out of order and which can be maintained by those having only a superficial knowledge of mechanisms; and a wrapping device which may be used in conjunction with existing scale equipment without making the scale permanently unusable for other purposes.

Additional objects and advantages will be apparent from the following description taken in conjunction with the drawings, in which:

Figure 2 is a side elevation with a portion of the supporting structure broken away;

Figure 3 is a plan view with the sealing iron holder removed;

Figure 4 is a partial rear elevation as seen at line 4—4 of Figure 3;

Figures 7, 9, 11, and 13 are plan views of successive stages in package preparation;

Figures 8, 10, 12, 14, 15, and 16 are elevational views of successive stages in package preparation; and Figure 17 is a finished package.

Figure 1:
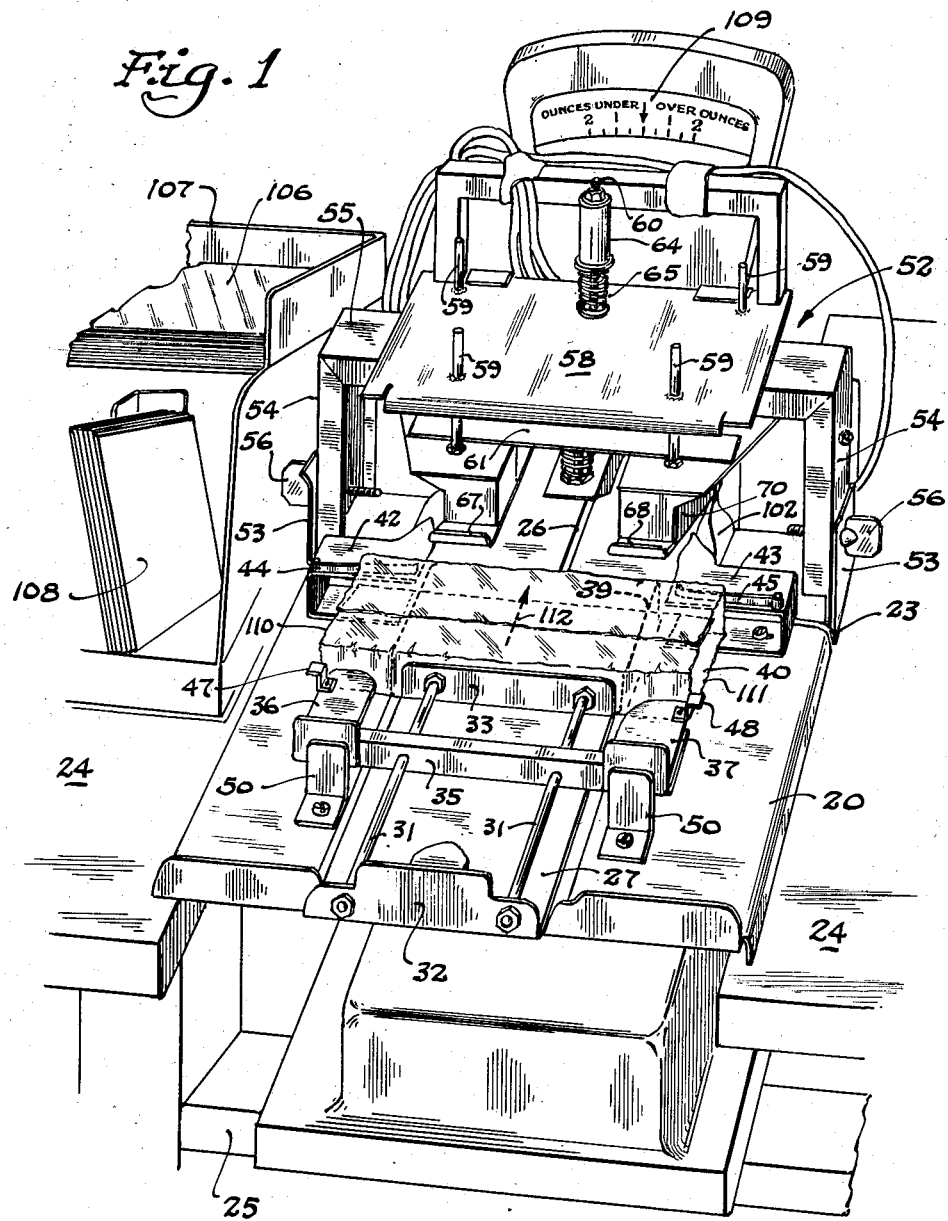
Figure 1 is a perspective view of an embodiment of the invention.

As illustrated in Figure 1, the package folding and sealing jig is mounted upon a base formed in two parts. The rear part 20 of the base is supported on the platform 21 of a scale 22, while the front half 23 of the base is mounted on a table 24. The scale 22 is mounted in a recessed portion of table 24 and supported from the frame of the table by members 25.

Along both portions 20 and 23 of the base is a slot 26 used to guide the movement of a pusher structure generally 27. A plurality of downwardly extending keys 28, attached to the bottom of pusher 27, is received in slot 26 to serve as a guide for the pusher. A stop 29 secured in slot 26 limits the rearward movement of pusher 27. A pair of guide rods 31 is attached to upwardly extending flanges 32 and 33 of pusher 27. Flange 33 functions as the actual pusher plate.

Slidably mounted on guide rods 31 is a cross bar 35 carrying bifurcated fingers 36 and 37 on either end thereof with the fingers projecting forwardly from the cross bar. Fingers 36 and 37 are mounted upon cross bar 35 so as to be spaced between the top and bottom of the product 39 which is to be sealed within a wrapper 40 as the product rests upon the base and are just to either side of the ends of the product (see Figures 2 and 3 respectively).

On the front part of the rear portion of the base 20 is a second set of fingers 42 and 43 respectively, formed by a generally U-shaped bracket attached to the base 20. These are single fingers and the two are spaced just slightly farther apart than the distance between the ends of product 39. Mounted just above and attached to fingers 42 and 43 is a pair of spring wipers 44 and 45 respectively.

Fingers 42 and 43 are mounted at such a height as to be between bifurcated fingers 36 and 37 respectively as the pusher 27 and cross bar 35 are pushed forwardly, as will be hereinafter described. As the fingers pass each other flanges 47 and 48 attached to the upper portion of fingers 36 and 37 respectively engage wipers 44 and 45 respectively to push the wipers back out of the way.

Forward movement of fingers 36 and 37 will be limited by fingers 42 and 43 contacting the rear connecting portion of the bifurcated fingers 36 and 37. A pair of stops 50, attached to the rear portion 20 of the base, will limit the rearward movement of the fingers 36 and 37.

The forward portion 23 of the base carries the sealing head generally 52. A pair of upwardly extending angles 53 attached to the base receives the downwardly extending legs 54 of the inverted U-shaped frame 55 of sealing head 52. Legs 54 are clamped in angles 53 by means of thumb bolts 56.

Mounted upon frame 55 is a flat plate 58 through which pass four guide rods 59. The holes in plate 58 through which the guide rods pass are slightly larger than the rods to permit free vertical movement of the rods. A mounting rod 60 similarly passes through plate 58. The lower end of each or rods 59 and 60 is secured to a second supporting plate 61. The upper end of rod 60 is threaded to receive a nut 63. A spacer 64 and spring 65 are mounted on rod 60 between the nut 63 and upper face of plate 58. Vertical guides 66, attached to base 23 and positioned just beyond the corners of plate 61, aid in aligning the plate during the vertical movement thereof, as is best seen in Figures 2 and 5.

Attached to plate 61 and extending downwardly therefrom is a pair of upper plows 67 and 68 respectively. The plows 67 and 68 are bent from sheet metal with the rearward or entering end of each plow projecting upwardly, as illustrated at 69 on plow 68. Each has a downwardly extending blade 70 with the two plows 67 and 68 being so mounted that the blades 70 are just slightly farther apart than the width of the product 39 to be wrapped.

Figure 5:
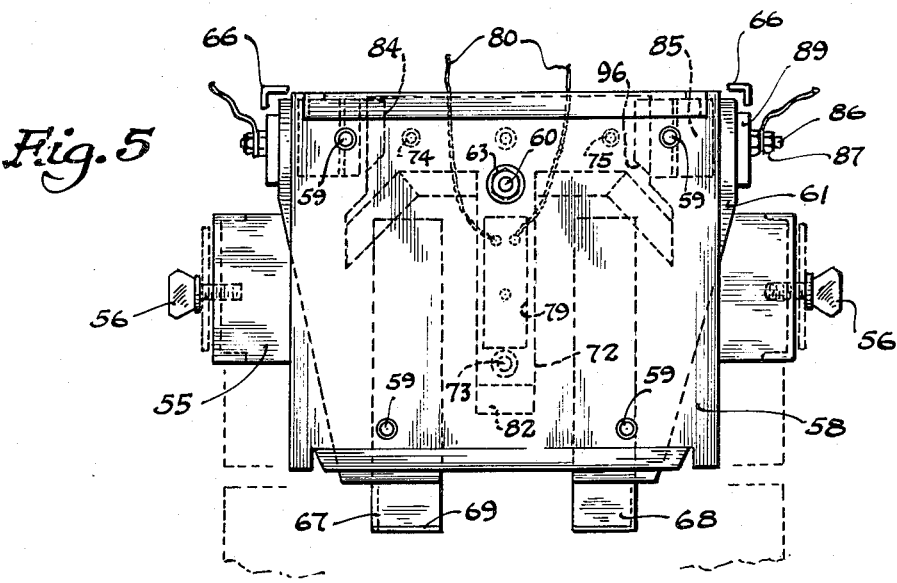
Figure 5 is a plan view of the sealing iron holder as seen at line 5—5 of Figure 2.
Figure 6:
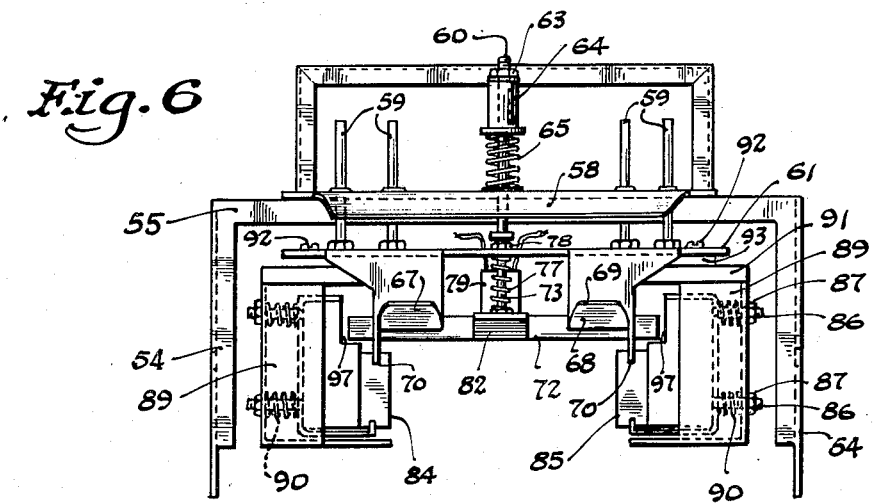
Figure 6 is an elevation of the sealing iron holder of Figure 5.

Also supported from plate 61 is a top sealing iron 72 formed generally in the shape of a T (see Figures 5 and 6). Three rods, 73, 74, and 75, are attached at their lower end to top iron 72 and pass through openings in plate 61. As is illustrated with respect to rod 73, each has a spring 77 thereabout urging the top sealing iron 72 downwardly from plate 61 with the extent of the downward movement being limited by a stop nut 78 threaded on rod 73 above plate 61. Preferably the stops 78 are set so that iron 72 is slightly lower than the bottom of plows 67 and 68. Iron 72 has a plurality of electrical resistance heating elements of a type well known in the art, one being illustrated at 79. Electrical current is carried to the heating elements through wires 80. The rearward or entering edges of the T-shaped iron 72 are beveled as illustrated at 82.

Also secured to plate 61 and extending downwardly therefrom is a pair of end sealing irons 84 and 85. Except for the difference of right or left-hand, each of the irons is identical and the construction of each will be apparent from the following description of the right-hand iron 85.

Projecting outwardly from iron 85 is a pair of rods 86, the ends of which are threaded to receive stop nuts 87. The stop nuts 87 are positioned to allow irons 84 and 85 to be somewhat closer together than are flanges 70 of plows 67 and 68. The rods 86 pass through openings in a channel-shaped bracket 89, and about rods 86, between the walls of the bracket 89 and the back of the iron 85, are springs 90. The upper crosspiece 91 of channel bracket 89 is attached to plate 61 by means of bolts 92. A strip of insulating material 93 is interposed between crosspiece 91 and plate 61 to reduce the heat transfer therebetween.

The inside entering edges of irons 85 and 84 are beveled as illustrated at 96 (Figure 5). Also the upper inside portion of the irons 85 and 84 are cut away to fit about top iron 72 as is illustrated at 97 (Figure 6). Each of the irons has an electrical resistance heating element inside with the elements connected to a source of electrical power by wires 98.

The bottom of the front portion 23 of the base is bent upwardly to form a second pair of plows 101 and 102. The entering end of each of these plows is well outside and below the ends of the package with the sides of the plows turning upwardly and inwardly towards the front of the machine to form a pair of generally vertical blades 103.

To operate the invention, the operator will take a sheet of thermoplastic wrapping material, such as cellophane, from a stack 106 in a rack 107 set on table 24. The sheet of wrapping material 40 is laid upon base 20 and, if desired, a printed advertising card may be taken from stack 108 and laid on the wrapper 40 with the printed advertising material facing downwardly. Thereafter, the product 39, which in the illustrated embodiment consists of a plurality of slices of cold meat, is neatly stacked on the wrapper 40 and the number of slices adjusted so as to bring the weight within the desired range as indicated upon the dial 109 of scale 22. Afterwards a second advertising card may be placed over the top of the stack and the two halves of the wrapper 40 pulled securely about the sides of the product 39. Preferably the forward edge of the wrapper 40 overlies the other edge as seen in Figure 2. These steps are illustrated in Figures 7 through 10. It will be noted that the extending ends 110 and 111 of the wrapping are normal to the path of movement through the jig as defined by slot 26.

With one hand, crosspiece 35 is pushed forwardly by the operator in the direction indicated by arrow 112, while at the same time the wrapper 40 is held securely about the product with the other hand. Fingers 36 and 37 pass forward along the ends of the product creasing the rear of the extended ends 110 and 111 of the wrapping material 40, as is illustrated in Figures 11 and 12. The operator releases crosspiece 35 and grasps flange 32 of pusher 27, sliding the pusher forwardly to slide the product 39 forward between fingers 42 and 43. As this is done, the fingers 42 and 43 crease the front of the extended ends 110 and 111, as illustrated in Figure 13, leaving an upper and lower flap, 113 and 114 respectively, remaining on the wrapping material which originally extended from the ends of the product. The springs 44 and 45 initially aid in making a tight fold about the foreward corners of the product. As the foreward motion continues, springs 44 and 45 are moved back away from the package by flanges 47 and 48.

As the operator continues to push the package forward into the jig, upper plows 67 and 68 contact the upper face of the wrapping material 40 to continue to hold it in place, while the package continues through the machine. The operator can then release his grasp of the wrapping material without the wrapping coming loose. Side flanges 70 of plows 67 and 68 turn upper flaps 113 of the wrapping material 40 downwardly about the ends of the product as illustrated in Figure 15. After plows 67 and 68 commence to turn the upper flaps downwardly the lower pair of plows 101 and 102 commences turning the lower flaps 114 upwardly.

Continued movement of the package into the jig brings the upper face of the wrapper 40 into contact with the leg of T-shaped sealing iron 72. Subsequently the remainder of the top of the wrapper comes into contact with the crosspiece of the same sealing unit 72 and the ends of the package come into contact with end sealing irons 84 and 85. These units soften the thermoplastic material in a manner well known in the art to produce a seal across the top and ends of the package. Continued movement of pusher 27 ejects the completed package into a chute 117 (Figures 2 and 3) to transfer the finished packages to the point where they are inserted into shipping containers.

The actual forming of the package is done upside-down; that is, what is to become the top of the finished package is the bottom of the wrapper as the package is formed thereon, as just described. Thus, when the package is turned over, the advertising card from stack 108 is attractively displayed upon the top of a neatly wrapped sealed package of product as is illustrated in Figure 17.

Use of the jig will show that there may be a substantial variance in the dimensions of the stack of product without causing unsatisfactory operation. Thus, the number of slices and the face dimensions thereof need not be exact. However, different jigs will be necessary where the package size is changed radically. The simplicity of the jig with its accompanying low cost makes it possible to have a number of different sized jigs around for different jobs.

The foregoing description of a specific embodiment is for the purpose of complying with Section 4888 of the Revised Statutes and should not be construed as imposing unnecessary limitations upon the appended claims.

I claim:

1. A device for use in preparing wrapped packages of product of a given size, said device including a base plate having an elongated slot therein, a pusher member supported on said plate for movement in a given direction to push packages through the device to fold the ends of the wrappings about said packages, said member having a guide member extending into said slot to restrain said pusher to a path of movement defined by said slot, said pusher member having a pusher plate at the forward end thereof, track means on said pusher member disposed to the rear of said pusher plate, a cross bar engaging said track means, a pair of bifurcated fingers, said fingers being attached to opposite ends of said bar with the fingers extending forwardly from said bar about parallel to said plate, a second pair of fingers mounted on said plate, said fingers being on opposite sides of said slot in a position to be received within the bifurcations of said first pair of fingers as said first fingers move in said direction, and two pairs of plows positioned beyond said second fingers with respect to said direction of movement, one of said pairs of plows being turned downwardly and one of said pairs being turned upwardly, said upwardly turned plows being attached to said plate, said downwardly turned plows being supported above said plate and resiliently urged toward said plate, said downwardly turned plows including a pressure shoe to ride on the top of the packages passing thereunder, said shoe having an upwardly turned entering edge, the plows of each of said pairs being spaced at opposite sides of said slot.

2. A device for use in preparing wrapped packages of product of a given size, said device including a base plate having an elongated slot therein, a pusher member supported on said plate for movement in a given direction to push packages through the device to fold the ends of the wrappings about said packages, said member having a guide member extending into said slot to restrain said pusher to a path of movement defined by said slot, said pusher member having a pusher plate at the forward end thereof, track means on said pusher member disposed to the rear of said pusher plate, a cross bar engaging said track means, a pair of bifurcated fingers, said fingers being attached to opposite ends of said bar with the fingers extending forwardly from said bar about parallel to said plate, a second pair of fingers mounted on said plate, said fingers being on opposite sides of said slot in a position to be received within the bifurcations of said first pair of fingers as said first fingers move in said direction, two pairs of plows positioned beyond said second fingers with respect to said direction of movement, one of said pairs of plows being turned downwardly and one of said pairs being turned upwardly, said upwardly turned plows being attached to said plate, said downwardly turned plows being supported above said plate and resiliently urged toward said plate, said downwardly turned plows including a pressure shoe to ride on the top of the packages passing thereunder, said shoe having an upwardly turned entering edge, the plows of each of said pairs being spaced at opposite sides of said slot, and heating means to seal the wrapping about said package, said heating means including a heating iron spaced at each side of said slot, and a third iron positioned at another side of the packages moving through said device, said irons being beyond said plows with respect to said direction of movement, said irons being attached to said plate and resiliently urged toward said packages moving through said device.

3. A device for use in preparing wrapped and sealed packages of a given size, said device including a frame, a scale, a base plate having two separate portions, one of said portions being mounted on said scale and the second of said portions being mounted on said frame, said plate having an elongated slot therein across each of said portions, a pusher member supported on said plate for movement in a given direction to push packages through the device to fold the ends of the wrappings about said packages, said member having a guide member extending into said slot to restrain said pusher to a path of movement defined by said slot, said pusher member having a pusher plate at the forward end thereof, track means on said pusher member disposed to the rear of said pusher plate, a cross bar engaging said track means, a pair of bifurcated fingers, said fingers being attached to opposite ends of said bar with the fingers extending forwardly from said bar about parallel to said plate, a second pair of fingers mounted on said plate, said fingers being on opposite sides of said slot in a position to be received within the bifurcations of said first pair of fingers as said first fingers move in said direction, two pairs of plows positioned beyond said second fingers with respect to said direction of movement, one of said pair of plows being turned downwardly and one of said pairs being turned upwardly, said upwardly turned plows being attached to said plate, said downwardly turned plows being supported above said plate and resiliently urged toward said plate, said downwardly turned plows including a pressure shoe to ride on the top of the packages passing thereunder, said shoe having an upwardly turned entering edge, the plows of each of said pair being spaced at opposite sides of said slot, and heating means to seal the wrapping about said package, said heating means including a heating iron spaced at each side of said slot, and a third iron positioned at another side of the packages moving through said device, said irons being beyond said plows with respect to said direction of movement, said irons being attached to said plate and resiliently urged toward said packages moving through said device.

HARRY G. HOLTZ.

References Cited in the file of this patent

UNITED STATES PATENTS

| Number | Name | Date |
|---|---|---|
| 874,620 | Patterson | Dec. 24, 1907 |
| 1,350,608 | Harriss | Aug. 24, 1920 |
| 1,545,316 | Haller | July 7, 1925 |
| 1,634,711 | Ferguson | July 5, 1927 |
| 1,824,266 | Haas | Sept. 22, 1931 |
| 2,114,624 | Bergstein | Apr. 19, 1938 |
| 2,281,887 | Smith | May 5, 1942 |
| 2,285,842 | Silberman | June 9, 1942 |
| 2,469,972 | Lowry et al. | May 10, 1949 |